(12) United States Patent
Li (10) Patent No.: US 9,912,796 B2
(45) Date of Patent: Mar. 6, 2018

(54) APPARATUS AND METHOD FOR CORRECTING AN INPUT NUMBER

(71) Applicants: Beijing Qihoo Technology Company Limited, Beijing (CN); Qizhi Software (Beijing) Company Limited, Beijing (CN)

(72) Inventor: Lianyu Li, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 0 days.

(21) Appl. No.: 15/101,867

(22) PCT Filed: Sep. 23, 2014

(86) PCT No.: PCT/CN2014/087201
§ 371 (c)(1),
(2) Date: Jun. 3, 2016

(87) PCT Pub. No.: WO2015/081749
PCT Pub. Date: Jun. 11, 2015

(65) Prior Publication Data
US 2016/0316052 A1  Oct. 27, 2016

(30) Foreign Application Priority Data
Dec. 6, 2013 (CN) .......................... 2013 1 0656875

(51) Int. Cl.
*G06F 3/048* (2013.01)
*H04M 1/725* (2006.01)
(Continued)

(52) U.S. Cl.
CPC ...... *H04M 1/72519* (2013.01); *G06F 3/0237* (2013.01); *G06F 3/0418* (2013.01); *H04M 1/56* (2013.01)

(58) Field of Classification Search
CPC .... H04M 1/72519; H04M 1/56; G06F 3/0418
See application file for complete search history.

(56) References Cited

U.S. PATENT DOCUMENTS 8,107,655 B1 * 1/2012 Howes ................ H04R 25/552
381/312
2007/0143703 A1 * 6/2007 Griffith ............. G03G 15/5016
715/780
(Continued)

FOREIGN PATENT DOCUMENTS

CN   101600181   12/2009
CN   101763217   6/2010
(Continued)

OTHER PUBLICATIONS

"How To Set The Date and Time On Apple iPhone 4", published to YouTube on Sep. 17, 2010 at https://youtu.be/00B-WbUkjQ, and retrieved on Jan. 6, 2017.*

(Continued)

*Primary Examiner* — Shourjo Dasgupta
(74) *Attorney, Agent, or Firm* — Harness, Dickey & Pierce, P.L.C.

(57) ABSTRACT

The present disclosure provides a system and method for correcting an input number, the system comprising a memory having instructions stored thereon and at least one processor to execute the instructions to cause: obtaining and displaying an input number; detecting a user's error correction operation and expanding display areas of digits of the input number after the error correction operation is detected; receiving correction on the input number; wherein the receiving correction on the input number comprises: receiving a user's correction on the input number by a digit correction control, wherein the digit correction control is disposed at a position corresponding to the expanded display (Continued)

area of the respective digit; and the digit correction control is a digit-rolling control or a digit-increasing/decreasing control.

13 Claims, 4 Drawing Sheets

(51) Int. Cl.
*H04M 1/56* (2006.01)
*G06F 3/041* (2006.01)
*G06F 3/023* (2006.01)

(56) References Cited

U.S. PATENT DOCUMENTS

| | | | |
|---|---|---|---|
| 2011/0080351 A1* | 4/2011 | Wikkerink | G06F 3/04883 345/173 |
| 2011/0154246 A1* | 6/2011 | Oh | G06F 3/04886 715/773 |
| 2012/0130546 A1* | 5/2012 | Matas | F24F 11/0012 700/276 |
| 2012/0169663 A1* | 7/2012 | Kim | G06F 3/0418 345/174 |
| 2015/0012867 A1* | 1/2015 | Yoon | G06F 3/04886 715/773 |

FOREIGN PATENT DOCUMENTS

| | | |
|---|---|---|
| CN | 101763218 | 6/2010 |
| CN | 102135838 | 7/2011 |
| CN | 103186343 | 7/2013 |
| CN | 103685747 | 3/2014 |

OTHER PUBLICATIONS

"How To Make GUI Adjust To Different Resolutions, Making The GUI Not Move Off The Screen On Lower Resolutions", published on Feb. 13, 2016 at http://answers.unity3d.com/questions/398396/how-to-make-gui-adjust-to-different-resolutions-ma.html, and retrieved on Jan. 6, 2017.*
Ethan Marcotte, "Responsive Web Design", published on May 25, 2010 at http://alistapart.com/article/responsive-web-design, and retrieved on Jan. 6, 2017.*
"Unity: Scaling The GUI Based On The Screen Resolution", published on May 12, 2011 at http://www.41post.com/3816/programming/unity-scaling-the-gui-based-on-the-screen-resolution, and retrieved on May 12, 2011.*
Simon Blackburn, "The Top 10 Types Of Phone Dialer And Automated Dialing Technology", published to web May 16, 2013 and retrieved on Oct. 4, 2017 from http://www.cedarcone.com/the-top-10-types-of-phone-dialer-and-automated-dialing-technology.*

* cited by examiner

APPARATUS AND METHOD FOR CORRECTING AN INPUT NUMBER

FIELD OF THE DISCLOSURE

The present disclosure relates to the field of communications, and particularly to a system and method for correcting an input number.

BACKGROUND OF THE DISCLOSURE

It is a common operation to input a phone number on a communication device. As a new-generation mobile communication device develops, currently most of communication devices such as mobile phones stop using a mechanical keypad and turn to a touch screen as an input device.

When a user inputs a phone number to be dialed or number for other operations in various manners, particularly when he inputs the number by using speech recognition or image recognition, input errors might occurs. Hence, after the number is input, the user needs to correct the number which has already been input. A common manner in the prior art is to delete the current input number and to input number again; or the user operates on the screen, locates an input cursor to a desired correction position, and activates a device input method to adjust.

However, there exist the following problems with the above methods of correcting already-input number: cancelling the operation and inputting number again cannot ensure correctness of newly-input number and causes repeated operations; regarding the method of locating a correction position and activating the device, accurate locating is difficult to accomplish when the device screen is smaller or when the device is used in a special environment such as a shaky transport vehicle, and furthermore, the locating, deleting and re-inputting procedure is complicated, the operation is frequent, and inconvenient use might be caused to the user.

SUMMARY OF THE DISCLOSURE

In view of the above problem, the present disclosure provides an apparatus for correcting an input number and a corresponding method for correcting an input number, which can overcome the above problems or at least partly solve the above problems.

A further object of the present disclosure is to improve the user's number-inputting operation efficiency.

According to an aspect of the present disclosure, there is provided a method for correcting an input number. The method for correcting the input number comprises the following steps: obtaining and displaying the input number; detecting a user's error correction operation, and expanding display areas of digits of the input number after the error correction operation is detected; receiving correction on the input number.

According to another aspect of the present disclosure, there is provided an apparatus for correcting an input number. The apparatus for correcting the input number comprises: a number inputting module configured to obtain and display the input number; a number error-correcting module configured to detect a user's error correction operation and expand display areas of digits of the input number after the error correction operation is detected; and an executing module configured to receive correction on the input number.

According to a further aspect of the present disclosure, there is provided a computer program which comprises a computer-readable code, and when the computer-readable code is run on a computing device, the computing device is caused to execute the method for correcting the input number according to the first aspect of the present disclosure.

According to a further aspect of the present disclosure, there is provided a computer-readable medium which stores the computer program according to the preceding aspect of the present disclosure.

According to the method and apparatus for correcting the input number of the present disclosure, after the error correction operation is detected, the display areas of the digits of the input number are expanded, a larger and more convenient correction area may be provided to the user in a limited operation space of the communication device, thereby facilitating the user's screen touch operation, reducing input errors and repeated operations due to inaccurate positioning, and boosting the user's convenience in operation.

Furthermore, according to technical solutions of the present disclosure, the display area is automatically expanded to a size suitable for the screen according to the resolution of the actual screen, and the present disclosure has good compatibility and is adapted for various devices.

The above description only generalizes technical solutions of the present disclosure. The present disclosure may be implemented according to the content of the description in order to make technical means of the present disclosure more apparent. Specific embodiments of the present disclosure are exemplified to make the above and other objects, features and advantages of the present disclosure more apparent.

DETAILED DESCRIPTION OF THE DRAWINGS

Various other advantages and merits will become apparent to those skilled in the art by reading through the following detailed description of preferred embodiments. Figures are only intended to illustrate preferred embodiments and not construed as limiting the present disclosure. In all figures, like reference number denote like parts. In the figures.

DETAILED DESCRIPTION OF PREFERRED EMBODIMENTS

The present disclosure will be further described below with reference to figures and specific embodiments.

The algorithm and display provided herein are not intrinsically related to any specific computer, virtual system or other devices. Various general systems may also be used together with a teaching based on this. According to the above depictions, structures required for constructing such type of systems are obvious. Besides, the present disclosure is not with respect to any specific programming language. It shall be understood that various programming languages may be used to implement the content of the present disclosure described here, and the above depictions for a specific language are intended to reveal preferred embodiments of the present application.

As the speech recognition and natural language processing technologies develop, speech technologies are increasingly applied to mobile devices to enhance the user experience. However, since accuracy of the speech recognition is much affected by environment noise, speakers' accents and machine apparatus parameters, 100 percent accurate recognition is difficult to achieve under some special application scenarios. In an event of a tiny error in the recognition, the recognition result needs to be modified quickly.

Figure 1:
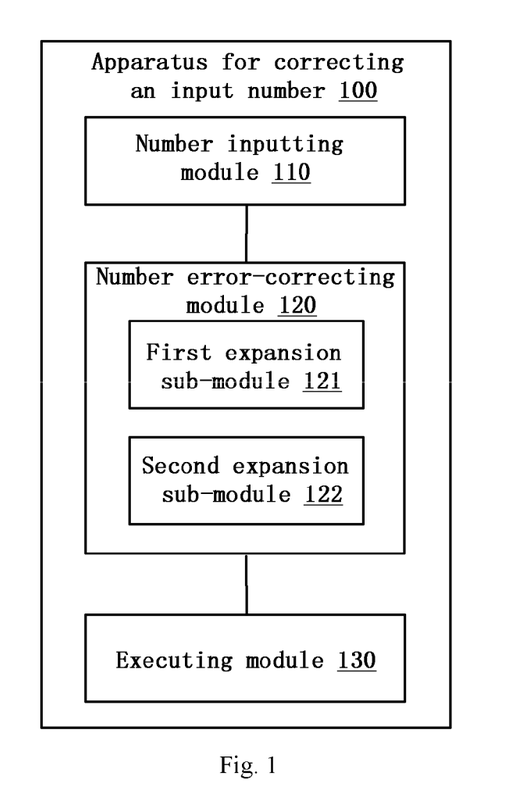
FIG. 1 is a block diagram of an apparatus for correcting an input number according to an embodiment of the present disclosure.

The method and apparatus for correcting an input number according to embodiments of the present disclosure may be applied to procedures of correcting number input in various manners, but not limited to the correction of speech-input number, including correction of number which are input normally via the touch screen or input via image recognition, optimize the correction procedures and improve accuracy of the user's input. FIG. 1 is a block diagram of an apparatus 100 for correcting an input number according to an embodiment of the present disclosure.

The apparatus 100 for correcting an input number generally may comprise: a number inputting module 110, a number error-correcting module 120 and an executing module 130. According to specific use environments and special requirements, the number error-correcting module 120 may further comprise: a first expansion sub-module 121 and/or a second expansion sub-module 122.

In an assembly of the apparatus 100 for correcting an input number, the number inputting module 110 is configured to obtain and display the input number, detect a user's error correction operation, and expand display areas of digits of the input number after the error correction operation is detected, and the executing module 130 is configured to receive correction on the input number.

The input number obtained by the number inputting module 110 may be number input in various manners, e.g., number recognized by a speech recognition device from the user's speech input, number recognized by an image recognition device from a selected or shot image, or number input by using a virtual keypad.

The number error-correcting module 120, upon detecting the user' error correction operation, may be configured to receive the user's operation of a preset button or a preset touch screen position in a predetermined time period; and determine the error correction operation according to the operation. For example, the screen for displaying the inputting number by the number inputting module 110 adds an error correction button at a corresponding position, and the error correction operation may be determined according to the user's operation of the error correction button to thereby expand display areas of digits accordingly.

Generally, parameters of the display area comprise a display height and a display width. The number error-correcting module 120 of the apparatus 100 for correcting input an number according to the embodiment of the present disclosure is provided with a first expansion sub-module 121 for expanding digit display width and a second expansion sub-module 122 for expanding a digit display height. The first expansion sub-module 121 and the second expansion sub-module 122 may be configured, for example, to individually increase a digit display width for transversely-arranged number, and individually increase a digit display height for longitudinally-arranged number, or they may be configured to increase the digit display height and width simultaneously.

Wherein the first expansion sub-module 121 is used to expand a width of display area of respective digit in the input number, and may be specifically configured to judge whether a resolution of the display screen is greater than a preset resolution; if yes, expand the width of display area of the input number to a preset width, and evenly distribute the preset width according to the number of bits of the input number; if not, expand the width of the display area of the input number to a width of the display screen and evenly distribute the width of the display screen according to the number of bits of the input number. Since there are various display screens of current terminals, screens are substantially different in terms of dimension and display resolution. Regarding a screen with a larger resolution, the width of the display area of the input number may be expanded to the preset width. Regarding a screen with a smaller resolution, the preset width might already exceed the width of the screen, in this case, the width of the display area of the input number is expanded to the width of the display screen. In this way, compatibility capabilities of different apparatuses may be solved, and the display area is automatically expanded to a size fit for the screen according to the resolution of the actual screen.

Since a screen of an ordinary device has a height greater than a width, the second expansion sub-module 122 may be configured to expand the height according to an expansion proportion of the width or expand the height according to a magnitude of a preset device independent pixel.

With the number error-correcting module 120 expanding spacing between digits of the number, the user may conveniently locate a locating cursor directly at a position of the digit to be corrected to thereby perform deletion and re-input. This manner still appears slightly complicated. This point may be further improved by using optimization of the executing module 130, wherein the executing module 130 may be configured to receive the user's correction on the input number by a digit correction control, wherein the digit correction control is disposed at a position corresponding to the expanded display area of the respective digit. The digit correction control may employ a digit-rolling control or a digit-increasing/decreasing control. These digit correction controls are used to facilitate the user's correction of input and save the operation of deleting wrong digits.

Figure 2:
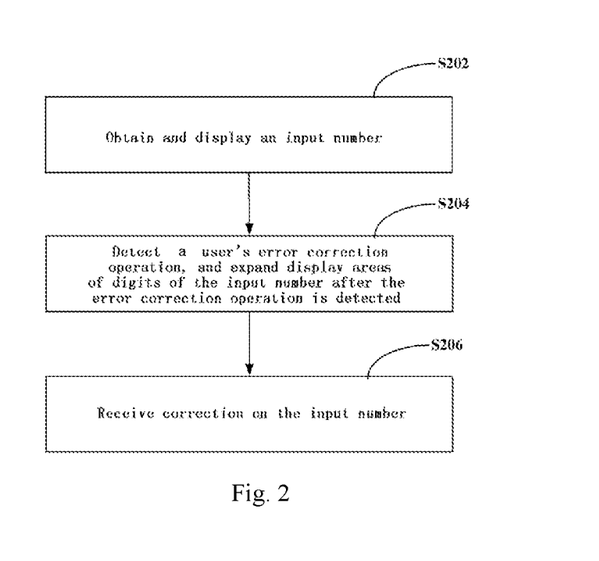
FIG. 2 is a flow chart of a method for correcting an input number according to an embodiment of the present disclosure.

The apparatus for correcting an input number according to the above embodiment is further described in conjunction with a method of correcting an input number according to an embodiment of the present disclosure. The method of correcting an input number according to the embodiment of the present disclosure may be executed by any type of apparatus 100 for correcting an input number according to the above embodiments to improve the user's operation experience. FIG. 2 is a flow chart of a method for correcting an input number according to an embodiment of the present disclosure. The method for correcting an input number comprises:

Step S202: obtaining and displaying an input number;

Step S204: detecting a user's error correction operation and expanding display areas of digits of the input number after the error correction operation is detected;

Step S206: receiving correction on the input number.

In step S202, the input number may be number input in various manners, e.g., number recognized by a speech recognition device from the user's speech input, number recognized by an image recognition device from a selected or shot image, or number input by using a virtual keypad. The displayed input number assists the user in checking the input number.

The detecting a user's error correction operation in step S204 may comprise: receiving the user's operation of a preset button or a preset touch screen position in a predetermined time period; and determining the error correction operation according to the operation. For example, an error correction button is added at a corresponding position on the screen for displaying the input number; if the user operates the error correction button, this indicates that the user finds an error in the input number, and needs to correct the input number, and then the follow proceeds to the step of expanding the display area.

Generally, parameters of the display area comprise a display height and a display width. The expanding display areas of digits of the input number in step S204 may comprise at least one of: expanding a width of the display area of respective digit in the input number; and expanding a height of the display area of respective digit in the input number.

Wherein the expanding a width of the display area of respective digit in the input number comprises: judging whether a resolution of the display screen is greater than a preset resolution; if yes, expanding the width of display area of the input number to a preset width, and evenly distributing the preset width according to the number of bits of the input number; if not, expanding the width of the display area of the input number to a width of the display screen and evenly distributing the width of the display screen according to the number of bits of the input number. Different expansion is performed for screens with different resolutions. For example, regarding a screen with a larger resolution, the width of the display area of the input number may be expanded to the preset width. Regarding a screen with a smaller resolution, the preset width might already exceed the width of the screen, in this case, the width of the display area of the input number is expanded to the width of the display screen. In this way, compatibility capabilities of different apparatuses may be solved, and the display area is automatically expanded to a size fit for the screen according to the resolution of the actual screen.

Since digits displayed on a screen of an ordinary device are arranged transversely, the expansion space is mainly limited by the width. The expanding a height of the display area of respective digit in the input number comprises: expanding the height according to an expansion proportion of the width or expanding the height according to a magnitude of a preset device independent pixel.

With spacing between digits of the number being expanded, the user may conveniently locate a locating cursor directly at a position of the digit to be corrected to thereby perform deletion and re-input. To save the step of deleting wrong digits and further improve the user's experience, step S206 may receive the user's correction on the input number by a digit correction control, wherein the digit correction control is disposed at a position corresponding to the expanded display area of the respective digit. Optionally, the digit correction control is a digit-rolling control or a digit-increasing/decreasing control.

After the user completes the action of correcting number, he may execute a predetermined task according to the corrected input number, e.g., initiating a phone call, sending a message or modifying contacts.

Figure 3:
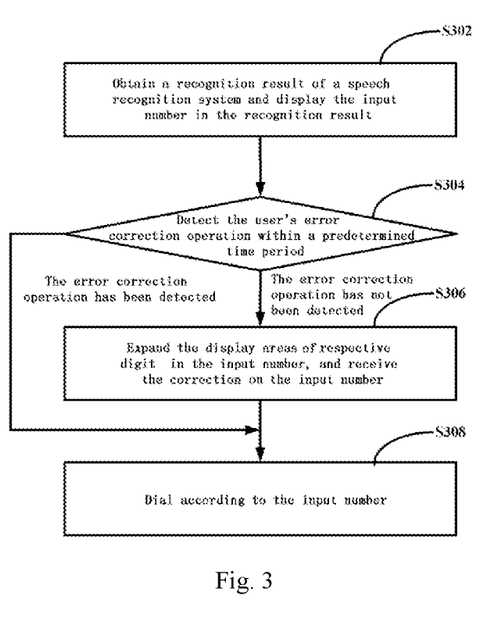
FIG. 3 is a flow chart of inputting mobile phone number by using speech recognition technology according to an embodiment of the present disclosure.

The method of inputting number according to the above embodiment is further described with an application example in which the user uses speech-input number to execute dialing a phone call. FIG. 3 is a flow chart of inputting mobile phone number by using speech recognition technology according to an embodiment of the present disclosure. The flow comprises:

Step S302: obtaining a number input by a user via a speech recognition system, the number being recognized by the speech recognized system from the user's speech, and displaying the input number as a recognition result. Generally, the user checks whether the input number is correct;

Step S304: activating a timeout mechanism (the timeout duration may be set as 5 seconds); if the user does not intervene the recognized input number as recognition result within the timeout duration, it is believed that the result is checked by the user free of errors, and step S308 is performed upon completion of the timeout duration.

Step 306: if within the timeout duration the user triggers an error correction operation in a manner such as clicking a correction button, the input number needs to be corrected. The correction display interface expands the display area of respective digit in the input number, and provides a digit correction control correspondingly, and receives the user's correction on the input number.

Step S308: dialing according to the input number.

As compared with a situation in the prior art in which it is difficult to accurately locate one digit among a series of digits, expanding the display area using step S306 assists the user in quickly and accurately completing the number-correcting action.

Figure 4:
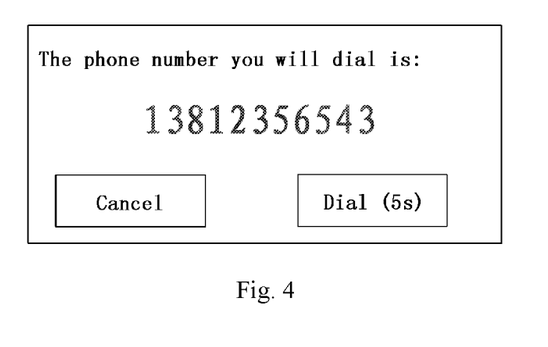
FIG. 4 is an effect diagram of an interface of displaying input number in a method for correcting the input number according to an embodiment of the present disclosure.

Within the timeout duration of the step S304, the display interface shown in FIG. 4 may be output. FIG. 4 is an effect diagram of an interface of displaying input number in a method for correcting the input number according to an embodiment of the present disclosure. In addition to the input number, FIG. 4 further provides two operation options "dial" and "cancel". If the user clicks the option "cancel", the operation is canceled and exits the dialing procedure; if the user clicks the option "dial", the call is initiated immediately according to the current number; in addition, if the user clicks a position in a scope of the screen other than "dial" and "cancel", it is believed that the input number needs to be corrected, and step S306 will be performed.

The error correction operation in step S306 may be implemented by responding to an onClick event of a card View, wherein View.OnclickListener is an interface as defined in a View class, there is an abstract void onClick (View v) method in the interface, and the user may implement this method to respond to the event.

Step S306 is executed, the timeout duration is canceled, and the display area of the input number is automatically expanded, wherein transverse expansion needs to ensure each digit of the number has the same width. The transverse dimension is expanded such that each digits of the number has an enough space to touch and operate. Generally, a final width of the screen on a mobile phone device is equivalent to or slightly narrower than a width of the mobile phone, as for a large-screen and high-resolution terminal such as a tablet PC, the input number is expanded to a width suitable for touch operation. The height of the longitudinal expansion may be expanded according to a width expansion proportion and adapted to accommodate three rows of digits.

User interface design of a mobile phone operating system is generally implemented by layout, and may be implemented by setting a width of the card to be "match_parent" and a height to be "90dp" (assume the height of 90dp may accommodate three rows of digits). The specific code is as follows:

android:layout_width="match_parent"
android:layout_height="90 dip"

The above dp unit in an Android system refers to device independent pixels (shortly, DIP), is an abstract measure unit based on a screen density, and satisfies normal display requirements of screens with different dimensions.

To adapt for the size of the display screen of the terminal, the expansion width of the display area may be determined by setting a screen resolution. For example, regarding a device having a screen resolution lower than 960*480, the expansion width of the display area is set as "match_parent", i.e., the width is expanded to a size matching with the width of the display screen, whereas regarding a device having a screen resolution higher than 960*480, the expansion width of the display area is set as a fixed width. The width of the display screen is evenly distributed in the whole expanded display area according to the number of bits of the input number, to ensure that each digit has an equal width.

Figure 5:
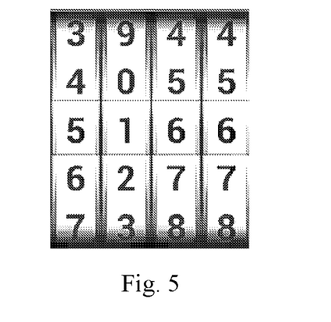
FIG. 5 is an effect diagram of a first kind of digit correction control in a method for correcting the input number according to an embodiment of the present disclosure.
Figure 6:
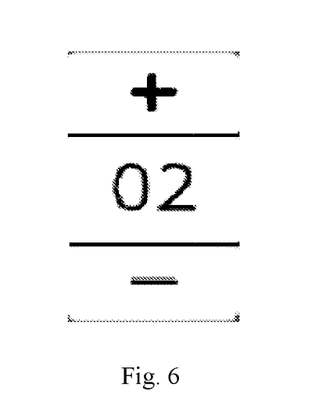
FIG. 6 is an effect diagram of a second kind of digit correction control in a method for correcting the input number according to an embodiment of the present disclosure.

The digit correction control used in step S306 may employ a digit-rolling control or a digit-increasing/decreasing control. FIGS. 5 and 6 are effect diagrams respectively illustrating a digit correction control in a method of correcting the input number according to an embodiment of the present disclosure. Such types of controls may be used to more conveniently facilitate the user's input-correcting operation.

A space occupied by the control may be determined by using layout_weight parameter in Android system, for example, corresponding to an ordinary 11-digit mobile phone number, layout_weight for each control is set as "1", and then the space occupied by their ViewGroups are evenly divided among the 11 controls. Each digit in the input number may be corrected by a corresponding digit correction control.

Take the number displayed in FIG. 4 as an example. Assume that the number input by the user via speech input is 13812346543, obviously the speech recognition system recognizes the digit "4" in the middle as digit "5", then the whole desired flow for the user' correction is: finding a position of a wrong digit, sliding the digit correction control to correct it as a correct digit, and then executing dialing.

Embodiments of the present disclosure may be applied to a terminal having a limited operation area to effectively improve the user's operation efficiency, boost operation experience of for example speech dialing function, reduce a rate of misoperation and increase usability of the product. The present disclosure may be extensively applied to speech assistant, speech dialing, speech short message or other product functions where digits need to be input, to quickly and efficiently correct the recognition errors of the number and improve the user's experience.

According to the technical solutions of embodiments of the present disclosure, after the error correction operation is detected, the display areas of the digits of the input number are expanded, a larger and more convenient correction area may be provided to the user in a limited operation space of the communication device, thereby facilitating the user's screen touch operation, reducing input errors and repeated operations due to inaccurate positioning, and boosting the user's convenience in operation.

Furthermore, according to technical solutions of the present disclosure, the display area is automatically expanded to a size suitable for the screen according to the resolution of the actual screen, and the present disclosure has good compatibility and is adapted for various devices. The description as provided here describes a lot of specific details. However, it is appreciated that embodiments of the present disclosure may be implemented in the absence of these specific details. Some embodiments do not specify in detail known methods, structures and technologies to make the description apparent.

Similarly, it should be appreciated that in order to simplify the present disclosure and help understand one or more aspects of the present disclosure, in the above depictions of exemplary embodiments of the present application, features of the present application are sometimes grouped together to an individual embodiment, figure or depiction thereof. However, the disclosed method should not be interpreted as the following intention: the claimed present disclosure claims more features than the features explicitly recited in each claim. More exactly, as reflected by the following claim set, aspects of the disclosure are less than all features of an individual embodiment disclosed previously. Therefore, the claim set conforming to a specific implementation mode is thereby explicitly incorporated into this specific implementation mode, wherein each claim itself serves as an individual embodiment of the present application.

Those skilled in the art may appreciate that modules in the apparatus in the embodiment may be changed adaptively and they are set in one or more apparatuses different from the present embodiment. Modules or units or assemblies in the embodiment may be combined into one module or unit or assembly, and besides, they may be divided into a plurality of sub-modules, subunits or subassemblies. Except that at least some of such features and/or processes or units are mutually repellent, all features disclosed in the specification (including the accompanying claims, abstract and figures) and all processes or units of any method or apparatus disclosed in this way may be combined by employing any combination. Unless otherwise stated expressly, each feature disclosed in the specification (including the accompanying claims, abstract and figures) may be replaced with an alternative feature providing identical, equivalent or similar objective.

In addition, those skilled in the art can understand that even though some embodiments described here include some features other than other features included in other embodiments, combination of features of different embodiments means being within the scope of the present application and forming different embodiments. For example, in the appended claim set, any one of the claimed embodiments may be used in an arbitrary combination manner.

Embodiments regarding parts in the present disclosure may be implemented in hardware, or implemented by software modules running on one or more processors, or implemented in their combinations. Those skilled in the art should understand that a microprocessor or digital signal processor (DSP) may be used in practice to implement some or all functions of some or all parts of the apparatus according to embodiments of the present disclosure. The present disclosure may also be implemented as an apparatus or device program (e.g., computer program and computer program product) for executing part or all of the method described here. Such programs implementing the present disclosure may be stored in a computer-readable medium, or may be in a form having one or more signals. Such signals can be obtained by downloading from the Internet, or provided on a carrier signal or provided in any other forms.

Figure 7:
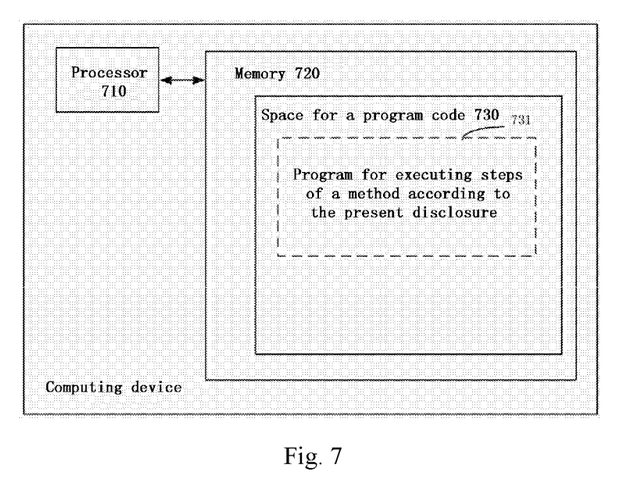
FIG. 7 is a block diagram schematically showing a computing device for executing the method of correcting an input number according to the present disclosure.
Figure 8:
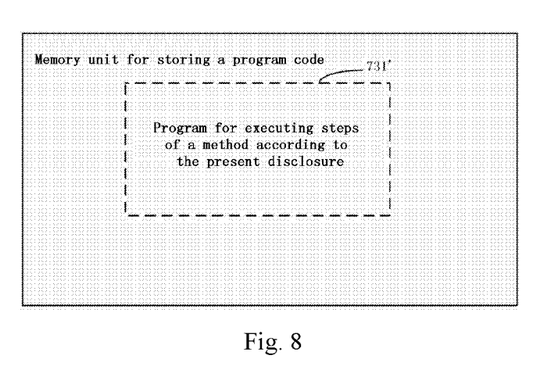
FIG. 8 schematically shows a memory unit for maintaining or carrying a program code for implementing the method of correcting an input number according to the present disclosure.

For example, FIG. 7 is a computing device for executing the method of correcting an input number according to the present disclosure, for example a mobile phone or a tablet PC. The computing device conventionally comprises a processor 710 and a computer program product or computer-readable medium in the form of a memory 720. The memory 720 may be a flash memory, EEPROM (Electrically Erasable Programmable Read-Only Memory), EPROM, hard disk or ROM-like electronic memory. The memory 720 has a storage space 730 for a program code 731 for executing any step of the above method. For example, the storage space 730 for the program code may comprise program codes 731 respectively for implementing steps of the above method. These program codes may be read from one or more computer program products or written into the one or more computer program products. These computer program products comprise program code carriers such as hard disk, compact disk (CD), memory card or floppy disk. Such computer program products are usually portable or fixed memory units as shown in FIG. 8. The memory unit may have a storage section, a storage space or the like arranged in a similar way to the memory 720 in the server of FIG. 7. The program code may for example be compressed in a suitable form. Usually, the memory unit includes a computer-readable code 731', namely, a code readable by a processor such as 710. When these codes are run by the computing device, the computing device is caused to execute steps of the method described above.

Reference herein to "one embodiment", "an embodiment", or to "one or more embodiments" means that a particular feature, structure, or characteristic described in connection with the embodiments is included in at least one embodiment of the disclosure. Further, it is noted that instances of the phrase "in one embodiment" herein does not certainly completely refer to the same embodiment.

It should be noted that the above embodiment illustrate the present disclosure but are not intended to limit the present disclosure, and those skilled in the art may design alternative embodiments without departing from the scope of the appended claims. In claims, any reference signs placed in parentheses should not be construed as limiting the claims. The word "comprising" does not exclude the presence of elements or steps not listed in a claim. The word "a" or "an" preceding an element does not exclude the presence of a plurality of such elements. The present disclosure may be implemented by virtue of hardware including several different elements and by virtue of a properly-programmed computer. In the apparatus claims enumerating several units, several of these units can be embodied by one and the same item of hardware. The usage of the words first, second and third, et cetera, does not indicate any ordering. These words are to be interpreted as names.

In addition, it should be noted that the language used in the specification has been principally selected for readability and instructional purposes, and may not have been selected to delineate or circumscribe the inventive subject matter. Therefore, those having ordinary skill in the art appreciate that many modifications and variations without departing from the scope and spirit of the appended claims are obvious. The disclosure of the present disclosure is intended to be illustrative, but not limiting, of the scope of the disclosure, which is set forth in the claims.

What is claimed is:

1. An apparatus for correcting an input number, the apparatus comprising:
   a memory having instructions stored thereon; and
   at least one processor to execute the instructions to cause:
   obtaining and displaying an input number in a display area, the input number having multiple digits;
   detecting a user's error correction operation when receiving the user's operation of a preset button or a preset touch screen position within a predetermined time period directly after obtaining and displaying the input number;
   expanding the display area for displaying the input number based on the detected error correction operation, by increasing a width of the display area to expand spacing between the digits of the input number, each digit having an equal width;
   receiving the user's correction on the input number by a digit correction control, the digit correction control disposed at a position corresponding to the expanded display area of a respective one of the multiple digits of the input number, and the digit correction control including a digit-rolling control or a digit-increasing/decreasing control; and
   automatically initiating a call according to the input number when the error correction operation is not detected within the predetermined time period.

2. The apparatus according to claim 1, wherein detecting the user's error correction operation comprises:
   determining the error correction operation according to the received operation.

3. The apparatus according to claim 1, wherein expanding the display area for displaying the input number comprises:
   expanding a height of the display area of the respective digit in the input number.

4. The apparatus according to claim 3, wherein expanding the height of the display area of the respective digit in the input number comprises:
   expanding the height according to an expansion proportion of the width or expanding the height according to a magnitude of a preset device independent pixel.

5. The apparatus according to claim 1, wherein expanding the width of the display area of the input number comprises:
   judging whether a resolution of a display screen is greater than a preset resolution;
   if yes, expanding the width of the display area of the input number to a preset width, and evenly distributing the preset width according to a number of bits of the input number; and
   if not, expanding the width of the display area of the input number to a width of the display screen and evenly distributing the width of the display screen according to the number of bits of the input number.

6. A non-transitory computer-readable medium having instructions stored thereon that, when executed by at least one processor, cause the processor to perform operations for correcting an input number, comprising:
   obtaining and displaying an input number in a display area, the input number having multiple digits;
   detecting a user's error correction operation when receiving the user's operation of a preset button or a preset touch screen position within a predetermined time period directly after obtaining and displaying the input number;

expanding the display area for displaying the input number based on the detected error correction operation, by increasing a width of the display area to expand spacing between the digits of the input number, each digit having an equal width;

receiving the user's correction on the input number by a digit correction control, the digit correction control disposed at a position corresponding to the expanded display area of a respective one of the multiple digits of the input number, and the digit correction control including a digit-rolling control or a digit-increasing/decreasing control; and automatically initiating a call according to the input number when the error correction operation is not detected within the predetermined time period.

7. A method for correcting an input number, the method comprising:

obtaining and displaying an input number in a display area, the input number having multiple digits;

detecting a user's error correction operation by receiving the user's operation of a preset button or a preset touch screen position within a predetermined time period directly after obtaining and displaying the input number;

expanding the display area for displaying the input number based on the detected error correction operation, by increasing a width of the display area to expand spacing between the digits of the input number, each digit having an equal width;

receiving the user's correction on the input number by a digit correction control, the digit correction control disposed at a position corresponding to the expanded display area of a respective one of the multiple digits of the input number, and the digit correction control including a digit-rolling control or a digit-increasing/decreasing control; and automatically initiating a call according to the input number when the error correction operation is not detected within the predetermined time period.

8. The method according to claim 7, wherein detecting the user's error correction operation comprises:

determining the error correction operation according to the received operation.

9. The method according to claim 7, wherein expanding the display area for displaying the input number comprises:

expanding a height of the display area of the respective digit in the input number.

10. The method according to claim 9, wherein expanding the height of the display area of the respective digit in the input number comprises:

expanding the height according to an expansion proportion of the width or expanding the height according to a magnitude of a preset device independent pixel.

11. The method according to claim 7, wherein expanding the width of the display area of the input number comprises:

judging whether a resolution of a display screen is greater than a preset resolution;

if yes, expanding the width of the display area of the input number to a preset width, and evenly distributing the preset width according to a number of bits of the input number; and if not, expanding the width of the display area of the input number to a width of the display screen and evenly distributing the width of the display screen according to the number of bits of the input number.

12. The method for correcting an input number according to claim 7, wherein obtaining the input number comprises at least one of:

performing speech recognition for a sound signal including input number information and extracting the input number;

performing words recognition for an image signal including the input number information and extracting the input number; and obtaining the input number input by the user using an input keypad.

13. The method for correcting an input number according to claim 7, wherein after detecting the user's error correction operation, the method further comprises:

executing a predetermined task according to the input number if the error correction operation is not detected within the predetermined time period.

* * * * *